US012677064B2

(12) United States Patent
Wang et al.

(10) Patent No.: US 12,677,064 B2
(45) Date of Patent: Jul. 7, 2026

(54) CONTROL METHOD AND APPARATUS FOR NEW ENERGY CAMERA DEVICE, CAMERA DEVICE, STORAGE MEDIUM, AND PROGRAM PRODUCT

(71) Applicant: SHENZHEN MICROBT ELECTRONICS TECHNOLOGY CO., LTD., Shenzhen (CN)

(72) Inventors: Zhongping Wang, Shenzhen (CN); Guo Ai, Shenzhen (CN); Ju He, Shenzhen (CN); Zuoxing Yang, Shenzhen (CN); Ruming Fang, Shenzhen (CN); Zhihong Xiang, Shenzhen (CN)

(73) Assignee: SHENZHEN MICROBT ELECTRONICS TECHNOLOGY CO., LTD., Shenzhen (CN)

( * ) Notice: Subject to any disclaimer, the term of this patent is extended or adjusted under 35 U.S.C. 154(b) by 147 days.

(21) Appl. No.: 18/726,072

(22) PCT Filed: Dec. 19, 2022

(86) PCT No.: PCT/CN2022/140019
§ 371 (c)(1),
(2) Date: Jul. 1, 2024

(87) PCT Pub. No.: WO2023/130947
PCT Pub. Date: Jul. 13, 2023

(65) Prior Publication Data
US 2025/0142205 A1     May 1, 2025

(30) Foreign Application Priority Data

Jan. 7, 2022     (CN) ......................... 202210012179.7

(51) Int. Cl.
*H04N 23/65* (2023.01)
*H02J 7/82* (2026.01)
(Continued)

(52) U.S. Cl.
CPC ............. *H04N 23/651* (2023.01); *H02J 7/82* (2026.01); *H02J 7/92* (2026.01); *H04N 23/617* (2023.01); *H02J 7/947* (2026.01); *H02J 7/96* (2026.01)

(58) Field of Classification Search
CPC .... H04N 23/651; H04N 23/617; H04N 23/65; H02J 7/82; H02J 7/92; H02J 7/947;
(Continued)

(56) References Cited

U.S. PATENT DOCUMENTS

2021/0272394 A1* 9/2021 Cella ...................... G06Q 40/08
2021/0357780 A1* 11/2021 Ji .............................. G06N 5/04

FOREIGN PATENT DOCUMENTS

CN      103227350 A      7/2013
CN      110364162 A      10/2019
(Continued)

OTHER PUBLICATIONS

International Search Report and Written Opinion for Application No. PCT PCT/CN2022/140019 dated Mar. 13, 2023.
(Continued)

*Primary Examiner* — Lin Ye
*Assistant Examiner* — Chan T Nguyen
(74) *Attorney, Agent, or Firm* — MARSHALL, GERSTEIN & BORUN LLP

(57)     ABSTRACT
A control method and apparatus for a new energy camera device, a camera device, a storage medium, and a program product are provided. The control method includes: determining a current electric quantity of the battery assembly and a predicted duration for full charging the battery assem-
(Continued)

10 bly by the new energy charging assembly; determining an operation mode to be adopted from N preset operation modes of the new energy camera device based on the current electric quantity and the predicted duration for full charging the battery assembly, wherein N is a positive integer of at least 2; and controlling the new energy camera device to operate in the determined operation mode. In the embodiments of the present application, the operation mode to be adopted is determined from a plurality of operation modes based on the current electric quantity and the predicted duration for full charging the battery assembly, which helps to solve the defect of the continuous operation in a low power consumption mode in the related art.

17 Claims, 5 Drawing Sheets

(51) Int. Cl.

| | | |
|---|---|---|
| *H02J 7/92* | (2026.01) | |
| *H02J 7/94* | (2026.01) | |
| *H02J 7/96* | (2026.01) | |
| *H04N 23/617* | (2023.01) | |

(58) Field of Classification Search
CPC ... H02J 7/96; H02J 7/933; H02J 7/971; Y02P 80/20; G06F 1/3206; G06F 1/3212
USPC ...................................................... 348/207.99
See application file for complete search history.

(56) References Cited

FOREIGN PATENT DOCUMENTS

| CN | 111654096 | A | * | 9/2020 | ............... H02J 7/35 |
|---|---|---|---|---|---|
| CN | 112328070 | A | | 2/2021 | |
| CN | 113400957 | A | | 9/2021 | |
| CN | 114039398 | A | | 2/2022 | |
| WO | WO-2016177214 | A1 | | 11/2016 | |

OTHER PUBLICATIONS

First Office Action, Chinese Patent Application No. 202210012179. 7, dated Feb. 21, 2022, 15 pages.
Second Office Action, Chinese Patent Application No. 202210012179. 7, dated Mar. 24, 2022, 9 pages.

* cited by examiner

201 determining a current electric quantity of the battery assembly and a predicted duration for full charging the battery assembly by the new energy charging assembly

202 determining an operation mode to be adopted from N preset operation modes of the new energy camera device based on the current electric quantity and the predicted duration for full charging the battery assembly, wherein N is a positive integer of at least 2

203 controlling the new energy camera device to operate in the determined operation mode

FIG.2

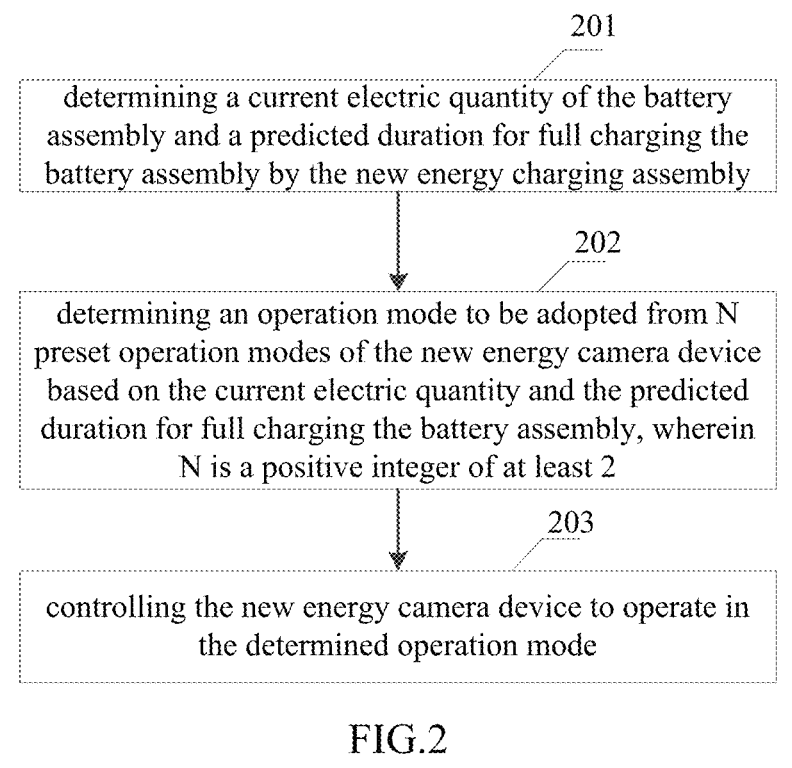

CONTROL METHOD AND APPARATUS FOR NEW ENERGY CAMERA DEVICE, CAMERA DEVICE, STORAGE MEDIUM, AND PROGRAM PRODUCT

This application claims priority to Chinese Patent Application No. 202210012179.7, entitled "Control Method and Apparatus for New Energy Camera Device, and Storage Medium", filed with China National Intellectual Property Administration on Jan. 7, 2022, the entire contents of which are incorporated herein by reference.

TECHNICAL FIELD

The present application belongs to the field of camera technology, and particularly relates to a control method and apparatus for a new energy camera device, a camera device, a storage medium, and a program product.

BACKGROUND ART

New energy has recently been developed and utilized by human, which needs further research and development. New energy generally includes: solar energy, wind energy, biomass energy, hydrogen energy, geothermal energy, marine energy, small hydropower, and chemical energy (such as ether-based fuels). A new energy camera device is a camera device powered by new energy. The operation principle of the new energy camera device is: converting new energy (such as solar energy) into electric energy through a new energy circuit board. On the one hand, the electric energy is stored in a battery, and on the other hand, the battery is controlled to supply power to a load device. If the load device requires an alternating current, the direct current is inverted to the alternating current by an inverter.

In the current new energy camera device, considering that the battery capacity and the charging power of the new energy circuit board are limited, in order to enable the device to have an operation time as long as possible, a light (small number of parameters and small amount of calculation) artificial intelligence (AI) algorithm is usually selected as far as possible as the computer vision intelligent algorithm (for example, an object detection algorithm) to shorten the running time of the algorithm, thereby reducing the energy consumption required for the running of the algorithm. However, it is difficult for the light AI algorithm to guarantee performance.

SUMMARY OF THE INVENTION

Embodiments of the present application propose a control method and apparatus for a new energy camera device, a camera device, a storage medium, and a program product.

The technical solutions of the embodiments of the present application are as follows.

A control method for a new energy camera device is provided. The new energy camera device includes a camera assembly, a battery assembly, and a new energy charging assembly configured to charge the battery assembly, and the method includes:

determining a current electric quantity of the battery assembly and a predicted duration for full charging the battery assembly by the new energy charging assembly;
    determining an operation mode to be adopted from N preset operation modes of the new energy camera device based on the current electric quantity and the predicted duration for full charging the battery assembly, wherein N is a positive integer of at least 2; and
    controlling the new energy camera device to operate in the determined operation mode.

A control apparatus for a new energy camera device is provided. The new energy camera device includes a camera assembly, a battery assembly, and a new energy charging assembly configured to charge the battery assembly, and the apparatus includes:

a first determination module, configured to determine a current electric quantity of the battery assembly and a predicted duration for full charging the battery assembly by the new energy charging assembly;
    a second determination module, configured to determine an operation mode to be adopted from N preset operation modes of the new energy camera device based on the current electric quantity and the predicted duration for full charging the battery assembly, wherein N is a positive integer of at least 2; and
    a control module, configured to control the new energy camera device to operate in the determined operation mode.

A new energy camera device is provided, including:
    a memory; and
    a processor,
    where an application program executable by the processor is stored in the memory for causing the processor to perform the control method for a new energy camera device according to the present application.

A computer-readable storage medium is provided, having stored therein computer-readable instructions for performing the control method for a new energy camera device according to the present application.

A computer program product is provided, including computer-readable instructions which, when executed by a processor, implement the control method for a new energy camera device according to the present application.

BRIEF DESCRIPTION OF THE DRAWINGS

FIG. 2 is an exemplary flowchart of a control method for a new energy camera device of the present application.

DETAILED DESCRIPTION OF EMBODIMENTS

Figure 1:
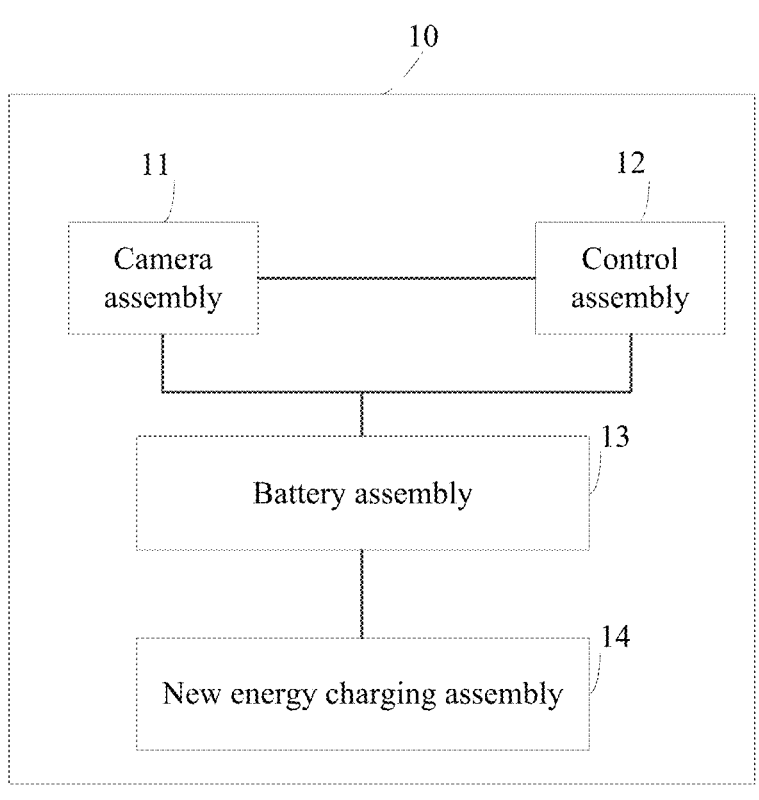
FIG. 1 is an exemplary structural diagram of a new energy camera device.

In order to make the purpose, technical solutions, and advantages of the present application clearer, the present application is described in further detail below in conjunction with the accompanying drawings.

For simplicity and clarity of description, the solutions of the present application are set forth below by describing several representative implementations. Numerous details of the implementations are described merely to facilitate an understanding of the solutions of the present application. However, it will be apparent that the technical solutions of the present application may be implemented without being limited to these details. In order to avoid unnecessarily obscuring solutions of the present application, some implementations have not been described in detail, but rather have been given frameworks. Hereinafter, "comprising" means "including but not limited to", "according to" means "at least according to, but not limited to only according to". Due to the linguistic conventions of the Chinese language, when the number of a constituent is not specifically indicated below, it means that the constituent may be one or more than one, or may be understood as at least one.

Hereinafter, terms related to embodiments of the present disclosure will be explained.

New energy: also known as unconventional energy, refers to various forms of energy other than traditional energy, usually the energy that has just started to be exploited or is being actively studied and needs to be promoted, such as solar energy, geothermal energy, wind energy, marine energy, biomass energy, and nuclear fusion energy.

Neural network processor unit (NPU): is a general term for a new type of processor based on a neural network algorithm.

Artificial intelligence (AI): is a new technical science that studies and develops theories, methods, techniques, and application systems for simulating, stretching, and expanding human intelligence.

AI algorithm: may be divided into supervised learning, unsupervised learning, semi-supervised learning, reinforcement learning, etc., according to a training way of a model. For example, a computer vision intelligent algorithm such as a pedestrian detection algorithm, a vehicle detection algorithm, an abnormality detection algorithm, or a face recognition algorithm.

Passive infrared detector (PIR): mainly includes an optical system, a pyroelectric sensor (or referred to as an infrared sensor), and an alarm controller. The detector itself does not emit any energy but only passively receives and detects infrared radiation from the environment. Once the infrared radiation of human body comes in, the pyroelectric device generates a sudden electrical signal through the focusing of optical system, thereby generating an alarm.

Voice activity detection (VAD): plays a very important role in voice signal processing, such as voice enhancement and voice recognition. It serves to identify voice segments and non-voice segments from a voice (pure or noisy) signal. A VAD system typically includes two parts, a feature extraction part and a voice/non-voice decision part.

The control method for a new energy camera device provided by the present disclosure may be applied to an application environment as shown in FIG. 1. FIG. 1 is an exemplary structural diagram of a new energy camera device. In FIG. 1, a new energy camera device 10 includes a camera assembly 11, a control assembly 12, a battery assembly 13, and a new energy charging assembly 14. The camera assembly 11 is configured to perform camera processing to acquire data (such as an image or a video). The control assembly 12 is configured to perform overall control on the new energy camera device 10, including controlling to wake up the camera assembly 11 and performing processing on the data acquired by the camera assembly 11 based on the computer vision intelligent algorithm, such as object detection. The new energy charging assembly 14 is configured to convert new energy (such as light energy of solar energy) into electric energy and has an electric energy output end. The battery assembly 13 is connected to the electric energy output end of the new energy charging assembly 14 to receive the electric energy outputted by the new energy charging assembly 14. The battery assembly 13 is connected to the camera assembly 11 and the control assembly 12 to supply power to the camera assembly 11 and the control assembly 12.

In FIG. 1, a typical application environment in which the control method for a new energy camera device provided by the present disclosure may be used is exemplarily described. A person skilled in the art will recognize that this description is exemplary only, and is not intended to limit the scope of the embodiments of the present application.

FIG. 2 is an exemplary flowchart of a control method for a new energy camera device of the present application. The new energy camera device as a controlled object includes a camera assembly, a battery assembly, and a new energy charging assembly configured to charge the battery assembly. The method shown in FIG. 2 may be implemented in a control assembly of the new energy camera device or may be applied to a control system other than the new energy camera device.

As shown in FIG. 2, the method includes the following steps.

At step 201, a current electric quantity of the battery assembly and a predicted duration for full charging the battery assembly by the new energy charging assembly are determined.

Here, the current electric quantity of the battery assembly is a current remaining electric quantity of the battery assembly. For example, the current remaining electric quantity may be characterized by a state of charge (SOC). The meaning of the SOC is: a percentage of a battery remaining available electric quantity to a total capacity.

In an exemplary embodiment, the current electric quantity of the battery assembly may be determined using multiple implementations. For example, implementation (1): the current remaining electric quantity is calculated from a current voltage value of the battery assembly;

implementation (2): the current remaining electric quantity is calculated from coulomb integrals of electric current and time;

implementation (3): the current remaining electric quantity is calculated by combining the coulomb integrals with voltage value correction.

A specific algorithm for determining the predicted duration for full charging the battery assembly by the new energy charging assembly may also have multiple implementations. For example, an electric quantity required to be charged may be calculated based on the current electric quantity of the battery assembly and the battery capacity. Then, the predicted duration for full charging the battery assembly is calculated based on a current charging power of the new energy charging assembly and the electric quantity required to be charged.

Typical examples of determining the current electric quantity of the battery assembly and the predicted duration for full charging the battery assembly are exemplarily described. A person skilled in the art will recognize that this description is exemplary only, and is not intended to limit the scope of the embodiments of the present application.

At step 202, an operation mode to be adopted is determined from N preset operation modes of the new energy camera device based on the current electric quantity and the predicted duration for full charging the battery assembly, where N is a positive integer of at least 2.

Each of the N operation modes contains a respective computer vision intelligent algorithm and a respective wake-up strategy. In each operation mode, the respective computer vision intelligent algorithm is used to perform processing, such as target detection processing, on the data acquired by the camera assembly, and the respective wake-up strategy is used to perform a specific way to wake up the new energy camera device.

In an exemplary embodiment, the computer vision intelligent algorithm includes an AI algorithm. For example, the AI algorithm may include a pedestrian detection algorithm, a vehicle detection algorithm, an abnormality detection algorithm, or a face recognition algorithm.

With regard to the AI algorithm used, in general, the larger the number of parameters (requiring the support of large-capacity memory (such as Double data rate (DDR)) with higher power consumption), the heavier the amount of calculation, and the higher the performance requirement. For example, when adopting a light (small number of parameters and small amount of calculation) AI algorithm, a running time of the algorithm on the NPU may be shortened to reduce the energy consumption required for running the algorithm. However, the light AI algorithm is usually inferior to a sub-medium (small number of parameters and medium amount of calculation) AI algorithm in a performance indicator of accuracy. The sub-medium AI algorithm is inferior to a medium AI algorithm (medium number of parameters and medium amount of calculation) in a performance indicator of accuracy, but the running time of sub-medium AI algorithm is less than that of the medium AI algorithm and the power consumption of the sub-medium AI algorithm is less than that of the medium AI algorithm. The medium AI algorithm is inferior to a heavy AI algorithm (heavy number of parameters and heavy amount of calculation) in a performance indicator of accuracy, but the running time of the medium AI algorithm is less than that of the heavy AI algorithm and the power consumption of the medium AI algorithm is less than that of the heavy AI algorithm.

The wake-up strategy may include a multi-stage wake-up strategy and a continuous operation strategy.

In the multi-stage wake-up strategy, the new energy camera device is usually in a dormant state. In the dormant state, the camera assembly does not acquire data, and the control assembly does not apply the computer vision intelligent algorithm to perform target detection processing. When the new energy camera device is awakened by a particular event (such as a voice event detected by a voice activity detection or an object event detected by the PIR), the new energy camera device enters an operation state from the dormant state. After entering the operation state, the camera assembly acquires data, and the control assembly applies the computer vision intelligent algorithm to the acquired data to perform processing, such as object detection processing.

In the continuous operation strategy, the new energy camera device is continuously in a normal operation state. At this time, the camera assembly continuously acquires data, and the control assembly continuously applies the computer vision intelligent algorithm to the data to perform processing, such as object detection processing.

In one exemplary embodiment, any two of the N operation modes are not identical in the computer vision intelligent algorithm or the wake-up strategy.

At step 203, the new energy camera device is controlled to operate in the determined operation mode.

It can be seen that the embodiments of the present application do not merely select a low power consumption mode, but determine the operation mode to be adopted from a plurality of operation modes based on the current electric quantity and the predicted duration for full charging the battery assembly and may dynamically select the operation mode based on an actual condition of the battery, which helps to solve the performance defect caused by the continuous operation in the low power consumption mode in the related art. In this way, the control method of the embodiments of the present application may take into account the operation performance and power consumption of the new energy camera device, thereby improving the dynamic adjustment capability of the new energy camera device on the operation performance and power consumption, namely, improving the adjustment flexibility on the performance and power consumption of the new energy camera device, and thus improving the operation performance of the new energy camera device under the premise of meeting a long-time operation.

In one exemplary embodiment, the operation modes include a first operation mode, a second operation mode, and a third operation mode; the first operation mode includes a first AI algorithm and a first wake-up strategy, the second operation mode includes a second AI algorithm and the first wake-up strategy, and the third operation mode includes a third AI algorithm and a second wake-up strategy; a complexity of the first AI algorithm is less than a complexity of the second AI algorithm, and the complexity of the second AI algorithm is less than a complexity of the third AI algorithm; the first wake-up strategy includes the multi-stage wake-up strategy, and the second wake-up strategy includes the continuous operation strategy. The second operation mode has a higher power consumption (corresponding to a better performance) than the first operation mode, and the third operation mode has a higher power consumption (corresponding to a better performance) than the second operation mode. Therefore, when the electric quantity is low and is predicted to be fully charged in a long time, the new energy camera device is controlled to operate in a power consumption-priority manner. When the electric quantity is sufficient and can be fully charged in a relatively short time, the new energy camera device is controlled to operate in a performance-priority manner.

In one exemplary embodiment, the determining an operation mode from the N preset operation modes of the new energy camera device based on the current electric quantity and the predicted duration for full charging the battery assembly of step 203 includes the following steps.

(1) The first operation mode is determined as the operation mode to be adopted when the current electric quantity is less than a predetermined first threshold value and the predicted duration for full charging the battery assembly is greater than a predetermined second threshold value. The first threshold value may be less than a third threshold value, or the first threshold value may be infinitely close to the third threshold value or equal to the third threshold value.

(2) The second operation mode is determined as the operation mode to be adopted when the current electric quantity is greater than a predetermined third threshold value and the predicted duration for full charging the battery assembly is greater than a predetermined fourth threshold value.

(3) The third operation mode is determined as the operation mode to be adopted when the current electric quantity is greater than a predetermined fifth threshold value and the predicted duration for full charging the battery assembly is greater than a predetermined sixth threshold value.

The third threshold value is less than the fifth threshold value, the second threshold value is greater than the fourth threshold value, and the fourth threshold value is greater than the sixth threshold value.

In one embodiment, the first threshold value is, for example, 50% of a rated electric quantity of the battery assembly, the third threshold value is, for example, 75% of the rated electric quantity of the battery assembly, and the fifth threshold value is, for example, 95% of the rated electric quantity of the battery assembly. The second threshold value is, for example, 5 hours, the fourth threshold value is, for example, 3 hours, and the sixth threshold value is, for example, 1 hour.

In another embodiment, the first threshold value is, for example, 40% of the rated electric quantity of the battery assembly, the third threshold value is, for example, 70% of the rated electric quantity of the battery assembly, and the fifth threshold value is, for example, 90% of the rated electric quantity of the battery assembly. The second threshold value is, for example, 4 hours, the fourth threshold value is, for example, 2 hours, and the sixth threshold value is, for example, 0.5 hour.

For examples, taking the implementation of new energy as solar energy as an example, an exemplary description is given. Before the solar camera device is shipped, based on the battery capacity and the solar panel performance, predicted durations for full charging the battery at different temperatures and at different solar panel charging powers are learned through a machine learning algorithm.

Furthermore, three operation modes are preset, namely, a low power consumption operation mode, a half-speed operation mode, and a full-speed operation mode, and an entry condition of each operation mode is set. For example, (a) when the electric quantity of the battery is less than 50% of the rated electric quantity (or maximum electric quantity) of the battery assembly, and it is predicted to fully charge the battery for more than 5 hours, the low power consumption operation mode is entered;

(b) when the electric quantity of the battery is greater than 75% of the rated electric quantity (or maximum electric quantity) of the battery assembly, and it is predicted to fully charge the battery for more than 3 hours, the half-speed operation mode is entered;

(c) when the electric quantity of the battery is greater than 95% of the rated electric quantity (or maximum electric quantity) of the battery assembly, and it is predicted to fully charge the battery for more than 1 hour, the full-speed operation mode is entered.

When a new energy intelligent camera device is powered on, the following operations are performed.

At step 1, the current electric quantity of the battery and the current charging power are checked.

At step 2, a duration for full charging the battery is predicted based on the current electric quantity of the battery and the current charging power.

At step 3, the current electric quantity and the predicted duration for full charging the battery are compared with the entry conditions of the operation modes to enter a corresponding operation mode.

In the full-speed operation mode, the camera assembly continuously acquires video signals and processes the data using a medium AI algorithm. When the AI algorithm has finished processing, video recording and other subsequent work are performed according to the processing result. Then, the electric quantity of the battery and the charging power are continuously checked to determine whether to enter another operation mode.

In the half-speed operation mode, the new energy intelligent camera device enters the dormant state until there is an event to wake up (such as the voice event detected by the voice activity detection or the object event detected by the PIR). After awakened by the event, the camera assembly acquires the video signal and processes the data using a sub-medium AI algorithm. When the AI algorithm has finished processing, video recording and other subsequent work are performed according to the processing result. Then, the electric quantity of the battery and the charging power are continuously checked to determine whether to enter another operation mode.

In the low power consumption operation mode, the new energy intelligent camera device enters the dormant state until there is an event to wake up (such as the voice event detected by the voice activity detection or the object event detected by the PIR). After awakened by the event, the camera assembly acquires the video signal and processes the data using a light AI algorithm. When the AI algorithm has finished processing, video recording and other subsequent work are performed according to the processing result. The electric quantity of the battery and the charging power are continuously checked to determine whether to enter another operation mode.

In one exemplary embodiment, the determining an operation mode from N preset operation modes of the new energy camera device based on the current electric quantity and the predicted duration for full charging the battery assembly of step 203 includes the following steps.

(1) The first operation mode is determined as the operation mode to be adopted when the current electric quantity is less than the predetermined first threshold value, or when the current electric quantity is within a range from the first threshold value to the predetermined second threshold value and the predicted duration is greater than the predetermined third threshold value.

(2) The second operation mode is determined as the operation mode to be adopted when the current electric quantity is within a range from the first threshold value to a predetermined second threshold value and the predicted duration for full charging the battery assembly is less than or equal to the third threshold value, or when the current electric quantity is greater than the second threshold value and the predicted duration is greater than the predetermined fourth threshold value.

(3) The third operation mode is determined as the operation mode to be adopted when the current electric quantity for full charging the battery assembly is greater than the second threshold value and the predicted duration for full charging the battery assembly is less than or equal to the predetermined fourth threshold value.

The first threshold value is less than the second threshold value, and the third threshold value is greater than the fourth threshold value.

For examples, taking the implementation of new energy as solar energy as an example, an exemplary description is given. Before the solar camera device is shipped, based on the battery capacity and the solar panel performance, predicted durations for full charging the battery at different temperatures and at different solar panel charging powers are learned through a machine learning algorithm. Furthermore, three operation modes are preset, namely, a low power consumption operation mode, a half-speed operation mode, and a full-speed operation mode, and an entry condition of each operation mode is set. For example, (a) when the electric quantity of the battery is less than 75% of the rated electric quantity (or maximum electric quantity) of the battery assembly, or the electric quantity is between 75%-95%, but it is predicted to fully charge the battery for more than 3 hours, the low power consumption operation mode is entered;

(b) when the electric quantity of the battery is between 75% and 95% of the rated electric quantity (or maximum electric quantity) of the battery assembly, and it is predicted to fully charge the battery for more than 3 hours, or the electric quantity is greater than 95% of the rated electric quantity (or maximum electric quantity) of the battery assembly, but it is predicted to fully charge the battery for more than 1 hour, the half-speed operation mode is entered;

(c) when the electric quantity of the battery is greater than 95% of the rated electric quantity (or maximum electric quantity) of the battery assembly, and it is predicted to fully charge the battery within 1 hour, the full-speed operation mode is entered.

When a solar energy intelligent camera device is powered on, the following operations are performed.

At step 1, the current electric quantity of the battery and the current charging power are checked.

At step 2, a duration for full charging the battery is predicted based on the current electric quantity of the battery and the current charging power.

At step 3, the current electric quantity and the predicted duration for full charging the battery are compared with the entry conditions of the operation modes to enter a corresponding operation mode.

In the full-speed operation mode, the camera assembly continuously acquires video signals and processes the data using the medium AI algorithm. When the AI algorithm has finished processing, video recording and other subsequent work are performed according to the processing result. Then, the electric quantity of the battery and the charging power are continuously checked to determine whether to enter another operation mode.

In the half-speed operation mode, the solar energy intelligent camera device enters the dormant state until there is an event to wake up (such as the voice event detected by the voice activity detection or the object event detected by the PIR). After awakened by the event, the camera assembly acquires the video signal and processes the data using the sub-medium AI algorithm. When the AI algorithm has finished processing, video recording and other subsequent work are performed according to the processing result. Then, the electric quantity of the battery and the charging power are continuously checked to determine whether to enter another operation mode.

In the low power consumption operation mode, the solar energy intelligent camera device enters the dormant state until there is an event to wake up (such as the voice event detected by the voice activity detection or the object event detected by the PIR). After awakened by the event, the camera assembly acquires the video signal and processes the data using the light AI algorithm. When the AI algorithm has finished processing, video recording and other subsequent work are performed according to the processing result. The electric quantity of the battery and the charging power are continuously checked to determine whether to enter another operation mode.

Taking the implementation of new energy as solar energy as an example, an exemplary description is given. A person skilled in the art will recognize that the new energy may also be implemented as a variety of energy forms, such as wind energy, biomass energy, hydrogen energy, geothermal energy, and marine energy, and the embodiments of the present application are not limited thereto.

Figure 3:
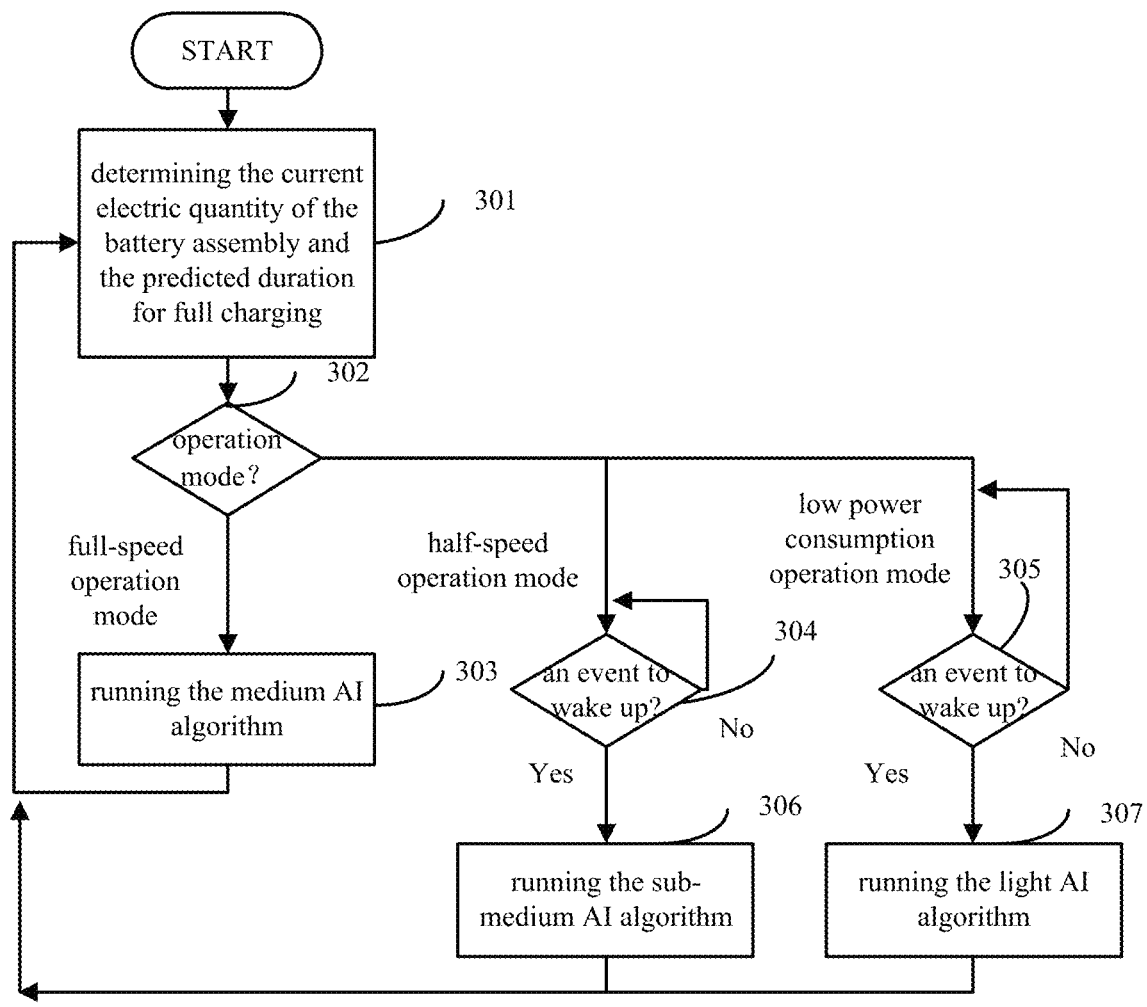
FIG. 3 is an exemplary flowchart of a control process for a new energy camera device of the present application.

FIG. 3 is an exemplary flowchart of a control process for a new energy camera device of the present application.

As shown in FIG. 3, the method includes the following steps.

At step 301, the current electric quantity of the battery assembly and the predicted duration for full charging are determined.

At step 302, the operation mode is determined based on the current electric quantity and the predicted duration for full charging. When it is determined to be the full-speed operation mode, step 303 and subsequent steps are performed. When it is determined to be the half-speed operation mode, step 304 and subsequent steps are performed. When it is determined to be the low power consumption operation mode, step 305 and subsequent steps are performed.

At step 303, the new energy camera device acquires data without being awakened by the event, runs the medium AI algorithm on the data, and returns to perform step 301.

At step 304, it is determined whether there is an event to wake up, and if so, step 306 and subsequent steps are performed; otherwise, after waiting for a predetermined time, step 304 is returned to be performed again.

At step 305, it is determined whether there is an event to wake up, and if so, step 307 and subsequent steps are performed; otherwise, after waiting for a predetermined time, step 305 is returned to be performed again.

At step 306, the new energy camera device acquires data, runs the sub-medium AI algorithm on the data, and returns to perform step 301.

At step 307, the new energy camera device acquires data, runs the light AI algorithm on the data, and returns to perform step 301.

Figures 4, 5:
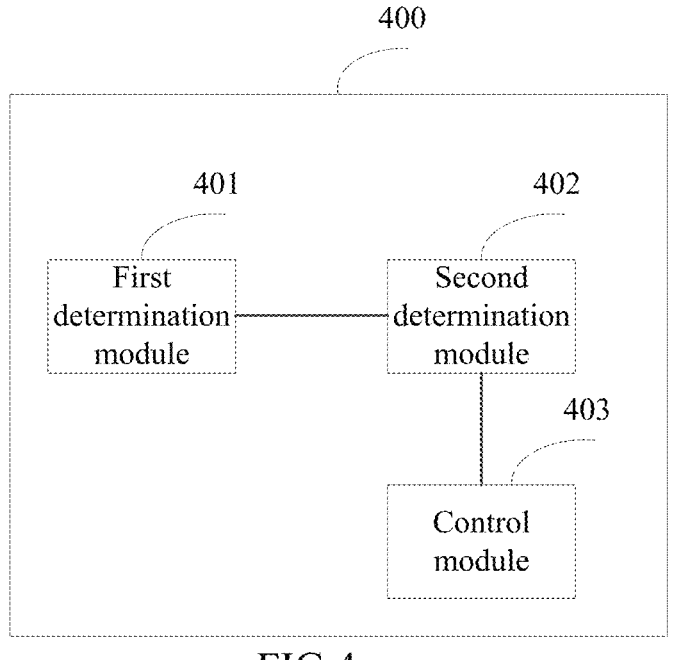
FIG. 4 is an exemplary structural diagram of a control apparatus for a new energy camera device of the present application.
FIG. 5 is an exemplary structural diagram of a control apparatus for a new energy camera device having a memory-processor architecture of the present application.

FIG. 4 is an exemplary structural diagram of a control apparatus for a new energy camera device of the present application. The new energy camera device includes a camera assembly, a battery assembly, and a new energy charging assembly configured to charge the battery assembly. As shown in FIG. 4, an apparatus 400 includes:

a first determination module 401, configured to determine a current electric quantity of the battery assembly and a predicted duration for full charging the battery assembly by the new energy charging assembly;

a second determination module 402, configured to determine an operation mode to be adopted from N preset operation modes of the new energy camera device based on the current electric quantity and the predicted duration for full charging the battery assembly, wherein N is a positive integer of at least 2; and a control module 403, configured to control the new energy camera device to operate in the determined operation mode.

In one exemplary embodiment, any two of the N operation modes are not identical in the computer vision intelligent algorithm or the wake-up strategy.

In one exemplary embodiment, the computer vision intelligent algorithm adopts the AI algorithm.

In one exemplary embodiment, N is equal to 3. The first operation mode includes the first AI algorithm and the first wake-up strategy, the second operation mode includes the second AI algorithm and the first wake-up strategy, and the third operation mode includes the third AI algorithm and the second wake-up strategy; the complexity of the first AI algorithm is less than the complexity of the second AI algorithm, and the complexity of the second AI algorithm is less than the complexity of the third AI algorithm; the first wake-up strategy includes the multi-stage wake-up strategy, and the second wake-up strategy includes the continuous operation strategy.

In one exemplary embodiment, the second determination module 402 is configured to perform at least one of the following.

The first operation mode is determined as the operation mode to be adopted when the current electric quantity is less than the predetermined first threshold value and the predicted duration for full charging is greater than the predetermined second threshold value.

The second operation mode is determined as the operation mode to be adopted when the current electric quantity is greater than the predetermined third threshold value and the predicted full charging time is greater than the predetermined fourth threshold value.

The third operation mode is determined as the operation mode to be adopted when the current electric quantity is greater than the predetermined fifth threshold value and the predicted duration for full charging is greater than the predetermined sixth threshold value.

The first threshold value is less than the third threshold value, the third threshold value is less than the fifth threshold value, the second threshold value is greater than the fourth threshold value, and the fourth threshold value is greater than the sixth threshold value.

In one exemplary embodiment, the second determination module 402 is configured to perform at least one of the following.

The first operation mode is determined as the operation mode to be adopted when the current electric quantity is less than the predetermined first threshold value, or when the current electric quantity is within the interval composed of the first threshold value and the predetermined second threshold value and the predicted duration for full charging is greater than the predetermined third threshold value.

The second operation mode is determined as the operation mode to be adopted when the current electric quantity is within the interval composed of the first threshold value and the second threshold value and the predicted duration for full charging is less than or equal to the third threshold value, or when the current electric quantity is greater than the second threshold value and the predicted duration for full charging is greater than the predetermined fourth threshold value.

The third operation mode is determined as the operation mode to be adopted when the current electric quantity is greater than the second threshold value and the predicted duration for full charging is less than or equal to the predetermined fourth threshold value.

The first threshold value is less than the second threshold value, and the third threshold value is greater than the fourth threshold value.

FIG. 5 is an exemplary structural diagram of a control apparatus for a new energy camera device having a memory-processor architecture of the present application.

As shown in FIG. 5, a control apparatus for the new energy camera device includes:

a processor 501; and a memory 502. An application program executable by the processor 501 is stored in the memory 502 for causing the processor 501 to perform the control method for a new energy camera device of the above embodiments.

The memory 502 may be specifically implemented as various storage media such as an electrically erasable programmable read-only memory (EEPROM), a flash memory, and a programmable program read-only memory (PROM). The processor 501 may be implemented to include one or more central processing units (CPUs) or one or more field programmable gate arrays that integrate one or more CPU cores. Specifically, the CPU or CPU core may be implemented as the CPU, MCU, or digital signal processor (DSP).

In summary, the embodiments of the present application select an AI algorithm matched therewith for video analysis through electric quantity sensing. When the electric quantity is low and is predicted to be fully charged in a long time, the new energy camera device operates in a power consumption-priority manner to ensure the continuous operation time. However, when the electric quantity is relatively sufficient and may be fully charged in a relatively short time, the new energy camera device operates in a performance-priority manner to make full use of the sufficient energy at this time (once the battery is fully charged, the output power of the excess new energy will be wasted). Therefore, the embodiments of the present application avoid the disadvantages of low accuracy and long response delay caused by the traditional new energy camera device operating in a low power consumption model and running a light but general AI algorithm.

Figure 6:
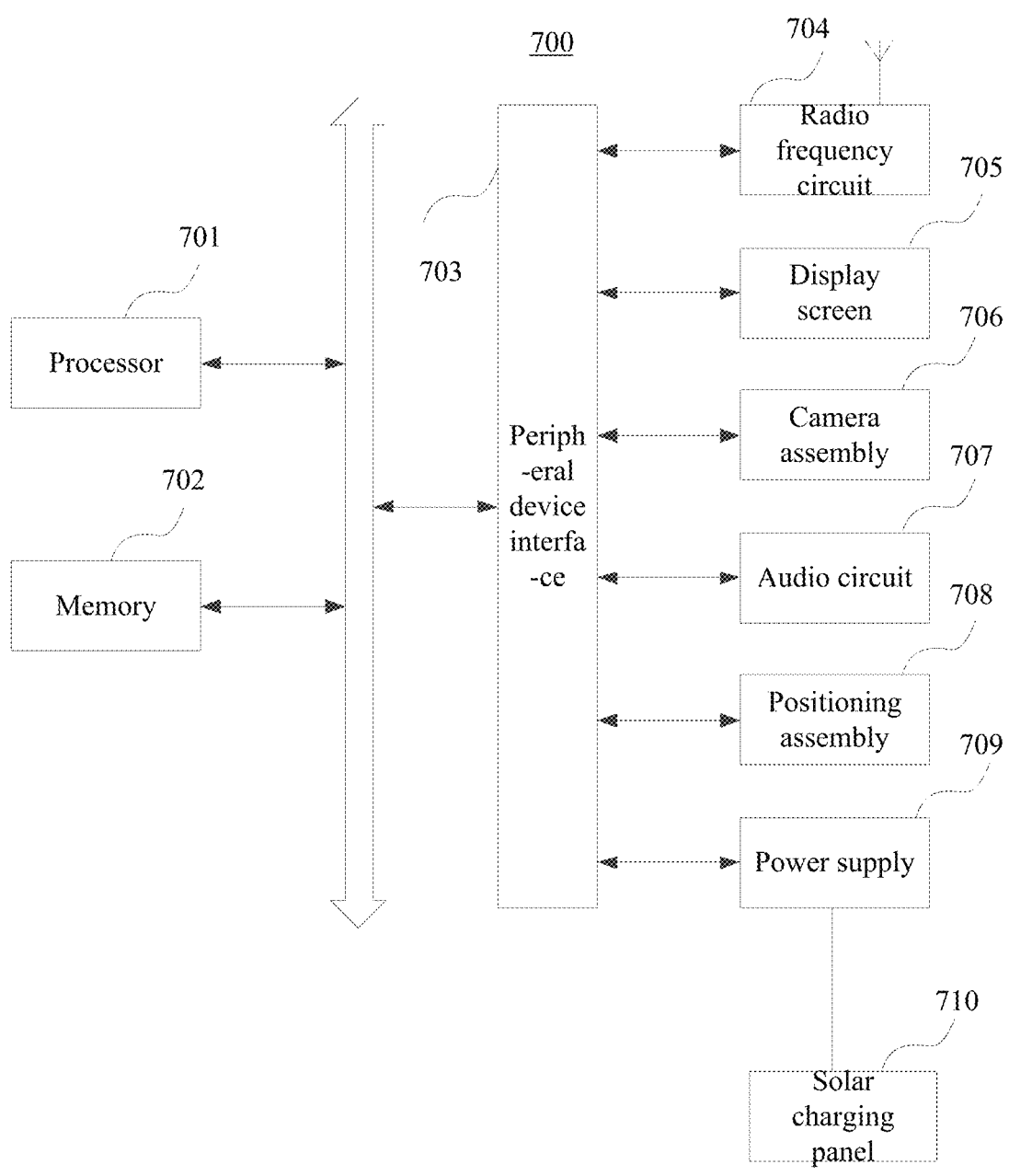
FIG. 6 is an exemplary structural diagram of a new energy camera device of the present application.

FIG. 6 is an exemplary structural diagram of a solar camera device of the present application.

Generally, the solar camera device 700 includes: a processor 701 and a memory 702.

The processor 701 may include one or more processing cores, such as a 4-core processor and an 8-core processor. The processor 701 may be implemented in at least one of the hardware forms of digital signal processing (DSP), field-programmable gate array (FPGA), and programmable logic array (PLA). The processor 701 may also include a main processor and a coprocessor. The main processor is a processor configured to process data in a wake-up state, also referred to as the CPU. The coprocessor is a low power consumption processor configured to process data in a standby state. In some embodiments, the processor 701 may be integrated with a graphics processing unit, and the GPU is configured to be responsible for rendering and drawing the content that a display screen needs to display. In some embodiments, the processor 701 may also include an AI processor, and the AI processor is configured to process computing operations related to machine learning. For example, the AI processor may be implemented as the NPU.

The memory 702 may include one or more computer-readable storage media, which may be non-transitory. The memory 702 may also include a high speed random access memory and a non-volatile memory, such as one or more disk storage devices, flash storage devices.

In some embodiments, a non-transitory computer-readable storage medium in the memory 702 is configured to store at least one instruction for execution by the processor 701 to implement the control method for a new energy camera device provided by various embodiments of the present disclosure. In some embodiments, the solar camera device 700 may also optionally include a peripheral device interface 703 and at least one peripheral device. The processor 701, memory 702, and peripheral device interface 703 may be connected through buses or signal lines. Various peripheral devices may be connected to the peripheral device interface 703 through buses, signal lines, or circuit boards. Specifically, the peripheral device includes at least one of a radio frequency (RF) circuit 704, a display screen 705, a camera assembly 706, an audio circuit 707, a positioning assembly 708, and a power supply 709.

The peripheral device interface 703 may be configured to connect at least one input/output (I/O) related peripheral device to the processor 701 and the memory 702. In some embodiments, the processor 701, the memory 702, and the peripheral device interface 703 are integrated on the same chip or circuit board. In some other embodiments, any one or two of the processor 701, the memory 702, and the peripheral device interface 703 may be implemented on a separate chip or circuit board, and the embodiments of the present application are not limited thereto.

The RF circuit 704 is configured to receive and transmit an RF signal, also referred to as an electromagnetic signal. The RF circuit 704 communicates with a communication network and other communication devices through the electromagnetic signal. The RF circuit 704 converts an electrical signal into the electromagnetic signal for transmission or converts a received electromagnetic signal into the electrical signal. Optionally, the RF circuit 704 includes an antenna system, an RF transceiver, one or more amplifiers, a tuner, an oscillator, a DSP, a codec chipset, a subscriber identity module card, etc. The RF circuit 704 may communicate with other terminals through at least one wireless communication protocol. The wireless communication protocol includes, but is not limited to, a metropolitan area network, generations of mobile communication networks (2G, 3G, 4G, and 5G), a wireless local area network, and/or a wireless fidelity (Wi-Fi) network. In some embodiments, the RF circuit 704 may also include a near field communication (NFC) related circuit, and the present disclosure is not limited thereto.

The display screen 705 is configured to display a user interface (UI). The UI may include graphics, texts, icons, videos, and any combination thereof. When the display screen 705 is the touch display screen, the display screen 705 also has the ability to collect touch signals at or above the surface of the display screen 705. The touch signal may be inputted as a control signal to the processor 701 for processing. At this time, the display screen 705 may also be configured to provide virtual buttons and/or virtual keyboards, also referred to as soft buttons and/or soft keyboards. In some embodiments, the display screen 705 may be one, which is provided on a front panel of the solar camera device 700. In other embodiments, the display screen 705 may be at least two, provided on different surfaces of the solar camera device 700 or in a folded design. In some embodiments, the display screen 705 may be a flexible display screen provided on a curved or folded surface of the solar camera device 700. Even further, the display screen 705 may be provided in a non-rectangular irregular graphic, i.e., a shaped screen. The display screen 705 may be made of materials such as a liquid crystal display (LCD) and an organic light-emitting diode (OLED).

The camera assembly 706 is configured to acquire images or videos. Optionally, the camera assembly 706 includes a front camera and a rear camera. Generally, the front camera is provided on a front panel of a terminal, and the rear camera is provided on a rear surface of the terminal. In some embodiments, the rear camera is at least two cameras being any one of a main camera, a depth of field camera, a wide-angle camera, and a long-focus camera to realize the fusion of the main camera and the depth of field camera to realize a background blurring function, and the fusion of the main camera and the wide-angle camera to realize a panoramic photographing and a virtual reality (VR) photographing function or other fusion photographing functions. In some embodiments, the camera assembly 706 may also include a flashlight. The flashlight may be a single color temperature flashlight or a double color temperature flashlight. The double color temperature flashlight refers to a combination of a warm light flashlight and a cold light flashlight that may be used for light compensation at different color temperatures.

The audio circuit 707 may include a microphone and a speaker. The microphone is configured to acquire sound waves from the user and the environment and convert the sound waves into electrical signals inputting to the processor 701 for processing or to the RF circuit 704 for voice communication. For the purpose of stereo acquisition or noise reduction, a plurality of microphones may be provided at different parts of the solar camera device 700. The microphone may also be an array microphone or an omni-directional acquisition type microphone. The speaker is configured to convert electrical signals from the processor 701 or the RF circuit 704 into sound waves. The speaker may be a conventional membrane speaker or a piezoelectric ceramic speaker. When the speaker is the piezoelectric ceramic speaker, not only the electrical signal may be converted into the sound wave that can be heard by the human, but also the electrical signal may be converted into the sound wave that cannot be heard by the human for ranging purposes. In some embodiments, the audio circuit 707 may also include a headphone jack.

The positioning assembly 708 is configured to locate a current geographic location of the solar camera device 700 to enable navigation or location based services (LBS). The positioning assembly 708 may be a positioning assembly based on the global positioning system (GPS) of the United States, the Beidou system of China, the Glonass system of Russia, or the Galileo system of the European Union.

The power supply 709 is configured to power various assemblies in the solar camera device 700. The power supply 709 may be alternating current, direct current, disposable batteries, or rechargeable batteries. When the power supply 709 includes the rechargeable battery, the rechargeable battery may support wired charging or wireless charging.

In some embodiments, the solar camera device 700 further includes a solar charging panel 710. The solar charging panel 710 directly or indirectly converts solar radiation energy into electrical energy through photoelectric effect or photochemical effect by absorbing sunlight.

It will be understood by a person skilled in the art that the above-described structure does not constitute a limitation on the solar camera device 700 and may include more or fewer assemblies than illustrated, or a combination of some assemblies, or components with different assemblies.

It should be noted that not all of the steps and modules in the above flowchart and structural diagrams are necessary, and some of the steps or modules may be omitted according to actual needs. An order for performing the steps is not fixed and may be adjusted as needed. The division of various modules is merely to facilitate the description of the functional division adopted. In actual implementation, a module may be implemented by multiple modules, functions of multiple modules may also be implemented by the same module, and these modules may be located in the same device or in different devices.

Hardware modules in the various implementations may be implemented mechanically or electronically. For example, one hardware module may include a specially designed permanent circuit or logic device (e.g., a dedicated processor such as a FPGA or ASIC) for completing a particular operation. The hardware module may also include a programmable logic device or circuit (e.g., including a general purpose processor or other programmable processors) temporarily configured by software to perform a particular operation. Implementation of the hardware module in a mechanical manner, using the dedicated permanent circuit, or using temporarily configured circuitry (e.g., configured by software) may be determined based on cost and time considerations.

The present application also provides a machine-readable storage medium storing instructions for causing a machine to perform the method of the present application. Specifically, a system or apparatus equipped with a storage medium may be provided on which software program codes implementing the functions of any of the above-mentioned embodiments are stored, and that causes a computer (or CPU or MPU) of the system or apparatus to read out and execute the program codes stored in the storage medium. Moreover, some or all of the actual operations may be performed by an operating system or the like operating on the computer through instructions based on the program code. The program code read out from the storage medium may also be written into a memory provided in an expansion board inserted into the computer or into a memory provided in an expansion unit connected to the computer, and then an instruction based on the program code causes the CPU or the like installed on the expansion board or the expansion unit to perform some or all of the actual operations, thereby implementing the functions of any of the above-mentioned embodiments.

Implementations of the storage media for providing the program code include floppy disks, hard disks, magneto-optical disks, optical disks (e.g., CD-ROM, CD-R, CD-RW, DVD-ROM, DVD-RAM, DVD-RW, DVD+RW), magnetic tapes, non-volatile memory cards, and ROM. Alternatively, the program code may be downloaded from a server computer or cloud through the communication network.

As used herein, "schematic" means "serving as an example, instance, or illustration", and any illustration and implementation described herein as "schematic" is not to be construed as a preferred or advantageous technical solution. For the sake of clarity, the various figures are only schematic representations of what is relevant to the present application and do not represent the actual structure of the product. In addition, in order to provide a concise understanding of the drawings, components having the same structure or function may be schematically illustrated in only one of the drawings or may be numbered in only one of the drawings. As used herein, "a" does not represent a limitation of the number of relevant parts of the present application to "only one", and "a" does not represent the exclusion of "more than one" of the number of relevant parts of the present application. As used herein, "upper", "lower", "front", "back", "left", "right", "inner", "outer", and the like are used merely to represent relative positional relationships between the relevant parts and do not define the absolute positions of these relevant parts.

The above are preferred embodiments of the present invention and are not intended to limit the scope of the present invention. All changes, equivalents, improvements, etc. that made within the spirit and principle of the present application are intended to be included in the scope of the present application.

What is claimed is:

1. A control method for a new energy camera device, the new energy camera device comprising a camera assembly, a battery assembly, and a new energy charging assembly configured to charge the battery assembly, and the method comprising:

determining a current electric quantity of the battery assembly and a predicted duration for full charging the battery assembly by the new energy charging assembly;

determining an operation mode to be adopted from N preset operation modes of the new energy camera device based on the current electric quantity and the predicted duration for full charging the battery assembly, wherein N is a positive integer of at least 2; and controlling the new energy camera device to operate in the determined operation mode;

wherein the N operation modes comprise a first operation mode, a second operation mode, and a third operation mode; the first operation mode comprises a first AI algorithm and a first wake-up strategy, the second operation mode comprises a second AI algorithm and the first wake-up strategy, and the third operation mode comprises a third AI algorithm and a second wake-up strategy; a complexity of the first AI algorithm is less than a complexity of the second AI algorithm, and the complexity of the second AI algorithm is less than a complexity of the third AI algorithm; the first wake-up strategy comprises a multi-stage wake-up strategy, and the second wake-up strategy comprises a continuous operation strategy.

2. The control method for the new energy camera device according to claim 1, wherein any two of the N operation modes are not identical in a computer vision intelligent algorithm or a wake-up strategy.

3. The control method for the new energy camera device according to claim 2, wherein the computer vision intelligent algorithm comprises an artificial intelligence (AI) AI algorithm.

4. The control method for the new energy camera device according to claim 1, wherein the determining the operation mode to be adopted from the N preset operation modes of the new energy camera device based on the current electric quantity and the predicted duration for full charging the battery assembly, comprises at least one of the following:

determining the first operation mode as the operation mode to be adopted when the current electric quantity is less than a predetermined first threshold value and the predicted duration for full charging the battery assembly is greater than a predetermined second threshold value;

determining the second operation mode as the operation mode to be adopted when the current electric quantity is greater than a predetermined third threshold value and the predicted duration for full charging the battery assembly is greater than a predetermined fourth threshold value; or determining the third operation mode as the operation mode to be adopted when the current electric quantity is greater than a predetermined fifth threshold value and the predicted duration for full charging the battery assembly is greater than a predetermined sixth threshold value, wherein the first threshold value is less than the third threshold value, the third threshold value is less than the fifth threshold value, the second threshold value is greater than the fourth threshold value, and the fourth threshold value is greater than the sixth threshold value.

5. The control method for the new energy camera device according to claim 1, wherein the determining the operation mode to be adopted from the N preset operation modes of the new energy camera device based on the current electric quantity and the predicted duration for full charging the battery assembly comprises at least one of the following:

determining the first operation mode as the operation mode to be adopted when the current electric quantity is less than a predetermined first threshold value, or when the current electric quantity is within a range from the first threshold value to a predetermined second threshold value and the predicted duration for full charging the battery assembly is greater than a predetermined third threshold value;

determining the second operation mode as the operation mode to be adopted when the current electric quantity is within a range from the first threshold value to the second threshold value and the predicted duration for full charging the battery assembly is less than or equal to the third threshold value, or when the current electric quantity is greater than the second threshold value and the predicted duration for full charging the battery assembly is greater than a predetermined fourth threshold value; or determining the third operation mode as the operation mode to be adopted when the current electric quantity is greater than the second threshold value and the predicted duration for full charging the battery assembly is less than or equal to the predetermined fourth threshold value, wherein the first threshold value is less than the second threshold value, and the third threshold value is greater than the fourth threshold value.

6. The control method for the new energy camera device according to claim 1, wherein the first threshold value is 50% of a rated electric quantity of the battery assembly, the third threshold value is 75% of the rated electric quantity of the battery assembly, and the fifth threshold value is 95% of the rated electric quantity of the battery assembly; the second threshold value is 5 hours, the fourth threshold value is 3 hours, and the sixth threshold value is 1 hour.

7. A new energy camera device, comprising:

a camera assembly, a battery assembly, and a new energy charging assembly configured to charge the battery assembly:

a memory; and a processor, wherein an application program executable by the processor is stored in the memory for causing the processor to:

determine a current electric quantity of the battery assembly and a predicted duration for full charging the battery assembly by the new energy charging assembly;

determine an operation mode to be adopted from N preset operation modes of the new energy camera device based on the current electric quantity and the predicted duration for full charging the battery assembly, wherein N is a positive integer of at least 2; and control the new energy camera device to operate in the determined operation mode;

wherein the N operation modes comprise a first operation mode, a second operation mode, and a third operation mode; the first operation mode comprises a first AI algorithm and a first wake-up strategy, the second operation mode comprises a second AI algorithm and the first wake-up strategy, and the third operation mode comprises a third AI algorithm and a second wake-up strategy; a complexity of the first AI algorithm is less than a complexity of the second AI algorithm, and the complexity of the second AI algorithm is less than a complexity of the third AI algorithm; the first wake-up strategy comprises a multi-stage wake-up strategy, and the second wake-up strategy comprises a continuous operation strategy.

8. The device according to claim 7, wherein any two of the N operation modes are not identical in a computer vision intelligent algorithm or a wake-up strategy.

9. The device according to claim 8, wherein the computer vision intelligent algorithm comprises an artificial intelligence (AI) algorithm.

10. The device according to claim 7, wherein the processor is configured to perform at least one of:

determining the first operation mode as the operation mode to be adopted when the current electric quantity is less than a predetermined first threshold value and the predicted duration for full charging the battery assembly is greater than a predetermined second threshold value;

determining the second operation mode as the operation mode to be adopted when the current electric quantity is greater than a predetermined third threshold value and the predicted duration for full charging the battery assembly is greater than a predetermined fourth threshold value; or determining the third operation mode as the operation mode to be adopted when the current electric quantity is greater than a predetermined fifth threshold value and the predicted duration for full charging the battery assembly is greater than a predetermined sixth threshold value, wherein the first threshold value is less than the third threshold value, the third threshold value is less than the fifth threshold value, the second threshold value is greater than the fourth threshold value, and the fourth threshold value is greater than the sixth threshold value.

11. The device according to claim 7, wherein the processor is configured to perform at least one of:

determining the first operation mode as the operation mode to be adopted when the current electric quantity is less than a predetermined first threshold value, or when the current electric quantity is within a range from the first threshold value to a predetermined second threshold value and the predicted duration for full charging the battery assembly is greater than a predetermined third threshold value;

determining the second operation mode as the operation mode to be adopted when the current electric quantity is within a range from the first threshold value to the second threshold value and the predicted duration for full charging the battery assembly is less than or equal to the third threshold value, or when the current electric quantity is greater than the second threshold value and the predicted duration for full charging the battery assembly is greater than a predetermined fourth threshold value; or determining the third operation mode as the operation mode to be adopted when the current electric quantity is greater than the second threshold value and the predicted duration for full charging the battery assembly is less than or equal to the predetermined fourth threshold value, wherein the first threshold value is less than the second threshold value, and the third threshold value is greater than the fourth threshold value.

12. The device according to claim 7, wherein the first threshold value is 50% of a rated electric quantity of the battery assembly, the third threshold value is 75% of the rated electric quantity of the battery assembly, and the fifth threshold value is 95% of the rated electric quantity of the battery assembly; the second threshold value is 5 hours, the fourth threshold value is 3 hours, and the sixth threshold value is 1 hour.

13. A computer-readable storage medium having stored therein computer-readable instructions which, when executed by a processor of a new energy camera device comprising a camera assembly, a battery assembly, and a new energy charging assembly configured to charge the battery assembly, causing the processor to:

determine a current electric quantity of the battery assembly and a predicted duration for full charging the battery assembly by the new energy charging assembly;

determine an operation mode to be adopted from N preset operation modes of the new energy camera device based on the current electric quantity and the predicted duration for full charging the battery assembly, wherein N is a positive integer of at least 2; and control the new energy camera device to operate in the determined operation mode;

wherein the N operation modes comprise a first operation mode, a second operation mode, and a third operation mode; the first operation mode comprises a first AI algorithm and a first wake-up strategy, the second operation mode comprises a second AI algorithm and the first wake-up strategy, and the third operation mode comprises a third AI algorithm and a second wake-up strategy; a complexity of the first AI algorithm is less than a complexity of the second AI algorithm, and the complexity of the second AI algorithm is less than a complexity of the third AI algorithm; the first wake-up strategy comprises a multi-stage wake-up strategy, and the second wake-up strategy comprises a continuous operation strategy.

14. The storage medium according to claim 13, wherein any two of the N operation modes are not identical in a computer vision intelligent algorithm or a wake-up strategy.

15. The storage medium according to claim 14, wherein the computer vision intelligent algorithm comprises an artificial intelligence (AI) algorithm.

16. The device storage medium according to claim 13, wherein the computer-readable instructions is configured to cause the processor to perform at least one of:

determining the first operation mode as the operation mode to be adopted when the current electric quantity is less than a predetermined first threshold value and the predicted duration for full charging the battery assembly is greater than a predetermined second threshold value;

determining the second operation mode as the operation mode to be adopted when the current electric quantity is greater than a predetermined third threshold value and the predicted duration for full charging the battery assembly is greater than a predetermined fourth threshold value; or determining the third operation mode as the operation mode to be adopted when the current electric quantity is greater than a predetermined fifth threshold value and the predicted duration for full charging the battery assembly is greater than a predetermined sixth threshold value, wherein the first threshold value is less than the third threshold value, the third threshold value is less than the fifth threshold value, the second threshold value is greater than the fourth threshold value, and the fourth threshold value is greater than the sixth threshold value.

17. The storage medium according to claim 13, wherein the computer-readable instructions is configured to cause the processor to perform at least one of:

determining the first operation mode as the operation mode to be adopted when the current electric quantity is less than a predetermined first threshold value, or when the current electric quantity is within a range from the first threshold value to a predetermined second threshold value and the predicted duration for full charging the battery assembly is greater than a predetermined third threshold value;

determining the second operation mode as the operation mode to be adopted when the current electric quantity is within a range from the first threshold value to the second threshold value and the predicted duration for full charging the battery assembly is less than or equal to the third threshold value, or when the current electric quantity is greater than the second threshold value and the predicted duration for full charging the battery assembly is greater than a predetermined fourth threshold value; or determining the third operation mode as the operation mode to be adopted when the current electric quantity is greater than the second threshold value and the predicted duration for full charging the battery assembly is less than or equal to the predetermined fourth threshold value, wherein the first threshold value is less than the second threshold value, and the third threshold value is greater than the fourth threshold value.

* * * * *